United States Patent [19]
Clonch et al.

[11] Patent Number: 5,664,932
[45] Date of Patent: Sep. 9, 1997

[54] PIVOTED LIFTING DEVICE

[75] Inventors: David M. Clonch, Beckley, W. Va.; Freddy D. Boyd, Pounding Mill; Michael J. Cook, Lebanon, both of Va.

[73] Assignee: Long-Airdox Company, Oak Hill, W. Va.

[21] Appl. No.: 309,225

[22] Filed: Sep. 20, 1994

[51] Int. Cl.$^6$ ................................................. B66C 1/00
[52] U.S. Cl. .................................. 414/680; 180/68.5
[58] Field of Search .......................... 414/680, 546; 180/68.5; 104/34

[56] References Cited

U.S. PATENT DOCUMENTS

| | | |
|---|---|---|
| 3,360,143 | 12/1967 | Allen . |
| 3,734,329 | 5/1973 | Grelck . |
| 3,834,563 | 9/1974 | Teti ................................. 104/34 X |
| 3,966,064 | 6/1976 | Felburn . |
| 4,065,013 | 12/1977 | Orthman . |
| 4,065,015 | 12/1977 | Radakovich . |
| 4,167,366 | 9/1979 | DeVivo . |
| 4,397,365 | 8/1983 | Harbe et al. ................... 104/34 X |
| 4,402,645 | 9/1983 | Broderick et al. . |
| 4,538,953 | 9/1985 | Abramson . |
| 4,547,118 | 10/1985 | Pittenger . |
| 4,692,085 | 9/1987 | Parsons . |
| 5,040,815 | 8/1991 | Evans . |
| 5,163,537 | 11/1992 | Radev . |
| 5,226,777 | 7/1993 | Radev . |
| 5,238,357 | 8/1993 | Patrick et al. . |
| 5,256,023 | 10/1993 | Patrick et al. . |
| 5,275,525 | 1/1994 | Grumblatt ................... 180/68.5 X |

FOREIGN PATENT DOCUMENTS

| | | |
|---|---|---|
| 0192994A1 | 1/1986 | European Pat. Off. . |
| 1107983 | 10/1964 | United Kingdom . |
| 2254309A | 2/1992 | United Kingdom . |
| 2255755A | 4/1992 | United Kingdom . |
| 2263452A | 1/1993 | United Kingdom . |

*Primary Examiner*—Donald W. Underwood
*Attorney, Agent, or Firm*—Keck, Mahin & Cate

[57] ABSTRACT

The present invention is directed to a pivoted lifting device having a main support frame selectively pivotable about a horizontal axis and engagement arms connected to the main support frame by a pivot pin. The engagement arms include an engagement surface. The pivoted lifting device allows the entire engagement surface to contact an article prior to the article being moved from an at rest position.

20 Claims, 4 Drawing Sheets

PIVOTED LIFTING DEVICE

FIELD OF THE INVENTION

The present invention relates generally to a pivoted lifting device for vehicles, and more particularly a pivoted lifting device for a battery changing system for electrically powered underground mining vehicles having a main vehicle frame and a battery support attached to the main vehicle frame.

BACKGROUND OF THE INVENTION

Low profile mining vehicles such as scoops, haulers, equipment movers and the like, powered by electric batteries are well known in the art. With present technology, a fully charged battery is capable of powering such a vehicle for the duration of one working shift or slightly in excess of eight hours. It generally requires approximately eight hours to fully recharge one of these batteries. In addition, it is usually recommended to allow the newly charged battery to "cool" for a period of approximately eight hours to improve the batteries performance. Since it is desirable to use the mining vehicles for more than one shift in a 24 hour period, the batteries in the vehicle must be changed after every shift.

It is therefore expedient to be able to quickly and efficiently change a battery on the mining vehicle so that the vehicle may return to productive use rather than remaining idle. The batteries in these types of vehicles are bulky and heavy, some having a weight in the range of several thousand pounds. As a result, the batteries are not easily removed from or added to the vehicles without assistance from a powerized lifting mechanism.

Usually, the electric battery of an underground mining vehicle is arranged in a heavy steel-plate battery tray located at the rear section of the mining vehicle for acting as a counterweight to the useful load which is normally supported by the front section of the vehicle. The battery tray protects the battery against physical damage during the operation of the vehicle as well as during the changing of the battery. However, if the battery case itself is strong enough to protect the battery, then a separate battery tray may not be necessary or the battery case will be supported by a lifting mechanism located on the vehicle. Since different arrangements of the battery may be employed, for simplicity of the description, the term "battery" should be understood to designate the whole exchangeable battery set, including the battery tray, if the battery is arranged in such a tray.

During operation of the mining vehicles or similar vehicles, the battery is supported by the vehicle and connected thereto for providing the power necessary to operate the vehicle. It has been the common practice in the art to include a battery changing system on the vehicle to load and unload batteries from the vehicle. This task has generally been accomplished through the use of hydraulically powered lifting systems for vertically moving the battery during battery changing operations. The combination of the vertical motion of the battery provided by the battery changing system and the horizontal motion of the vehicle itself, enables the operator to unload the drained battery from the vehicle onto a stand or the floor of a battery changing station and to load a fresh or recharged battery from the battery changing station onto the vehicle.

There are generally two different types of battery changing systems which are well known in the art. In the first type, the battery lays on the bottom plate of the vehicle main frame, which bottom plate is uninterrupted or cut in a "u" shape. Two rigid vertical hydraulic cylinders, acting upon horizontal brackets on the left and right sides of the battery, move the battery up and down during a battery changing operation. The major disadvantage of this first type of battery changing system is that the battery cannot be moved in a position lower than its normal position on top of the vehicle bottom plate.

In the second type of battery changing system, the battery is loaded on and secured to a battery support, such as a fork or a platform or a "U" shaped structure. This battery support under the action of a vertical hydraulic cylinder, moves up and down during a battery changing operation. The battery support is guided to move in the vertical direction by two parallel members attached firmly to the main frame of the vehicle. This second type of battery changing system is similar to the well known load-lifting system of a fork lift truck. The major disadvantages of this second type battery changing system are: first, the vertical travel of the battery is very short because the lengths of the vertical hydraulic cylinders and parallel guides are limited by the height of the vehicle main frame, and second, the parallel guides of the battery support are complicated and unreliable because it is difficult to keep them clean in an underground environment.

A further problem associated with the previous apparatus for lifting the battery onto the vehicle is the tendency for the battery to be pushed along the floor or against a wall in order to get the lifting arms of the battery changer underneath the lifting edge of the battery. This significantly increases the possibility of damaging the battery and the support structure in the mine during a battery changing operation.

SUMMARY OF THE INVENTION

The present invention overcomes the deficiencies of the prior art by providing a novel and unique battery changing system. The battery changing system of the present invention is provided with a lifting device incorporating a pivot positioned on the battery changing system to allow a portion of the lifting device to align with the lifting ledge of the battery without the necessity for sliding or tipping the battery. The present invention includes a rigid support frame pivotably connected at its lower end to a low profile vehicle. A pair of hydraulic cylinders rigidly mounted to an upper portion of the vehicle and to the upper end of the support frame allows the support frame to be pivoted about its lower end adjacent the vehicle. The support frame is provided with lift arms spaced apart on either side of the frame for contacting the lifting ledge of the battery. The lift arms are connected to the frame by a pivot pin, which allows the lift arms to fully engage the lifting surface of the battery initially without supplying any significant upward force even when the support frame is angled below horizontal. The present invention allows the battery to be lifted in a substantially vertical direction without any sliding of the battery along the floor, or a requirement that the battery be braced against the wall. It also prevents one end of the battery from being dropped when it is being unloaded from the vehicle.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
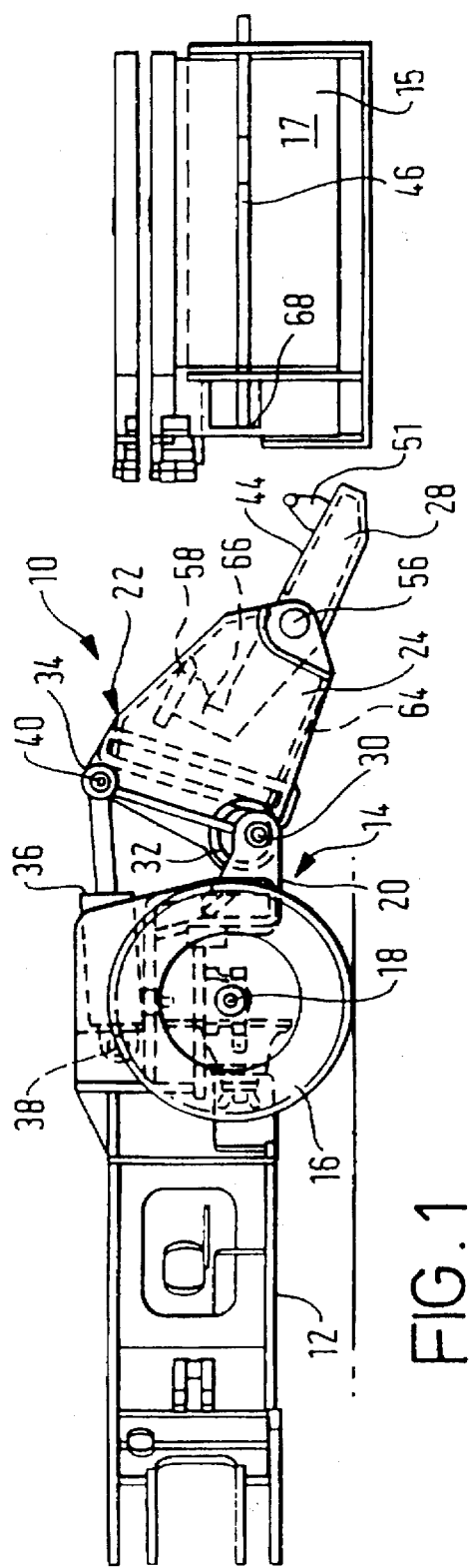
FIG. 1 is side elevational view of the lifting device of the present invention attached to the rearward end of a low profile mining vehicle illustrated disconnected from a battery.
Figure 2:
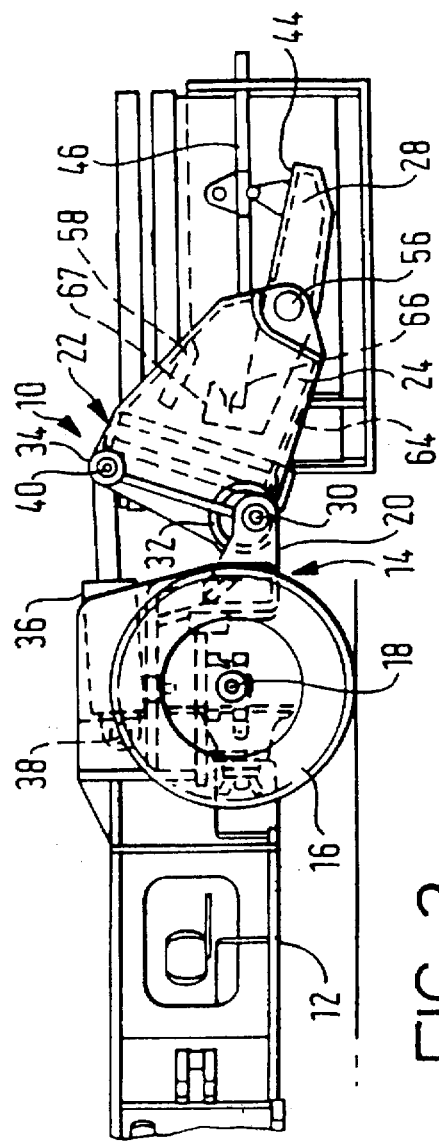
FIG. 2 is a side elevational view of the invention of FIG. 1 illustrating the battery support frame disposed at an angle below horizontal and the battery lift arms initially engaging the lifting ledge of the battery.
Figure 3:
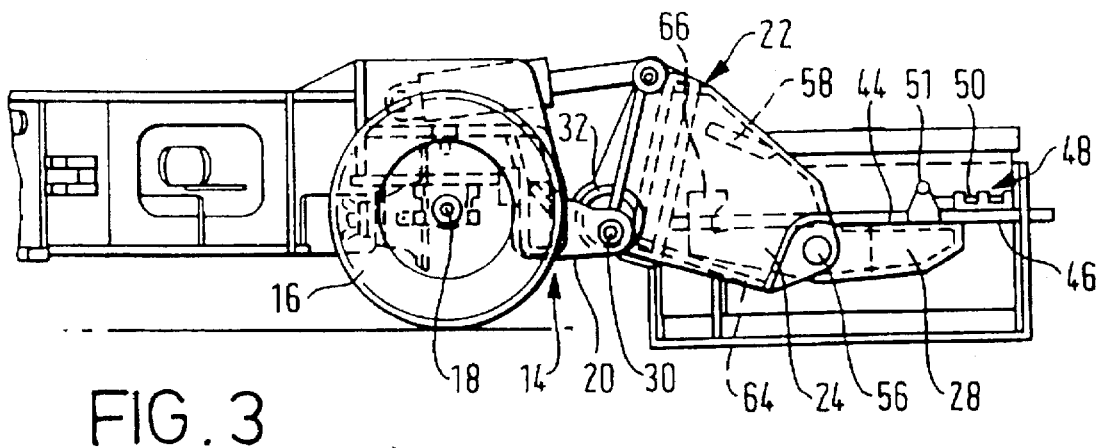
FIG. 3 is a side elevational view of the invention of FIG. 1, continuing the lifting operation of FIG. 2 and illustrating the lifting arm in flush engagement with the lifting ledge of the battery.
Figure 4:
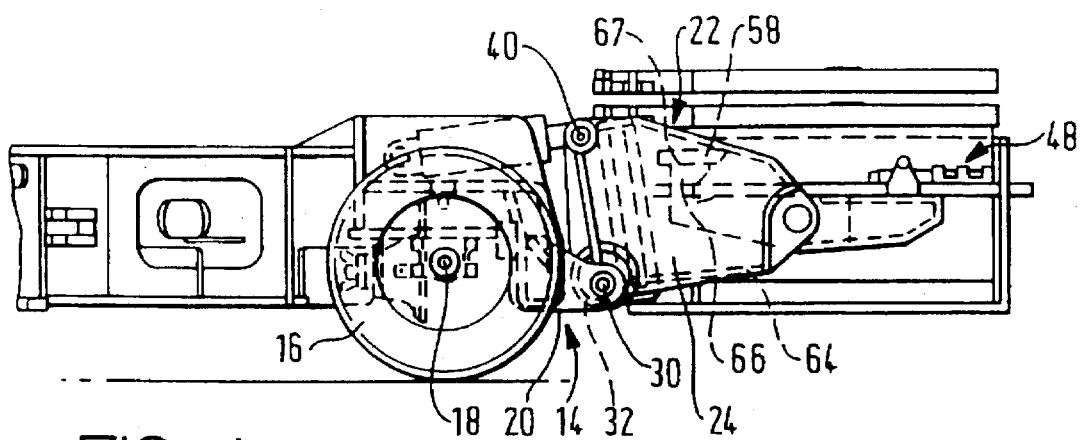
FIG. 4 is a side elevational view of the invention of FIG. 1 illustrating the battery position above the ground and locked in place on the vehicle and disposed in an orientation parallel to the ground.

Referring to the drawings, and particularly FIGS. 1 and 2, the pivoted lifting device of the present invention is illustrated and identified generally at 10. The pivoted lifting device 10 is part of a battery changing system for a low profile mining vehicle 12 such as a scoop, hauler equipment movers and the like. However, the description with respect to the battery changing system is merely exemplary as the device may be utilized to pick up a variety of other articles. The battery 15 is of a well known type generally surrounded by a protective case 17 and including an engagement area 46 that may take the form of a ledge or pins. The rearward end 14 of the low profile mining vehicle 12 as illustrated in FIG. 1 includes rear wheels 16 and axle 18 connected to main body frame 20.

Figure 7:
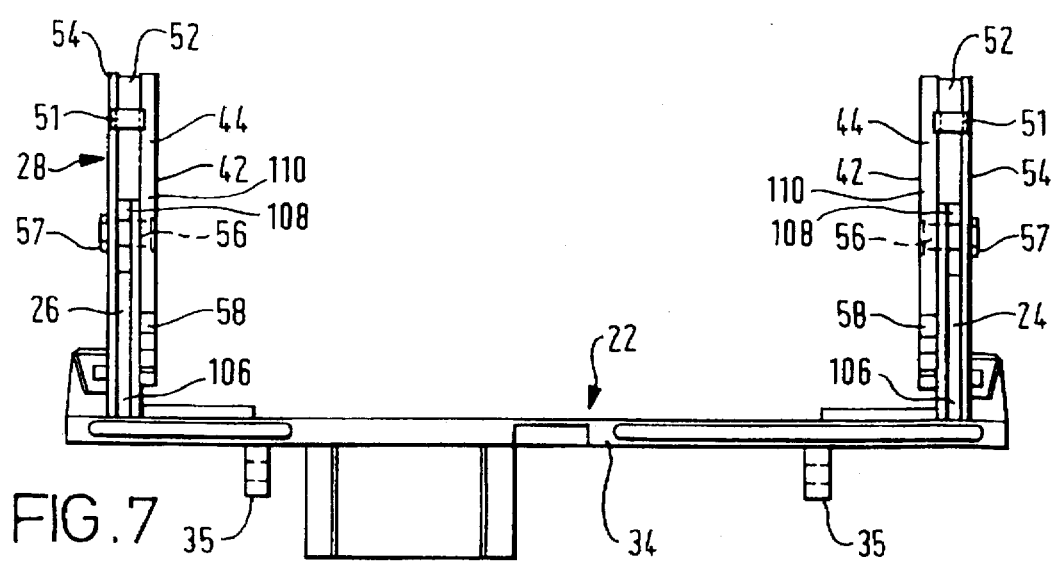
FIG. 7 is a top plan view of the pivoted lifting device of the present invention.
Figure 8:
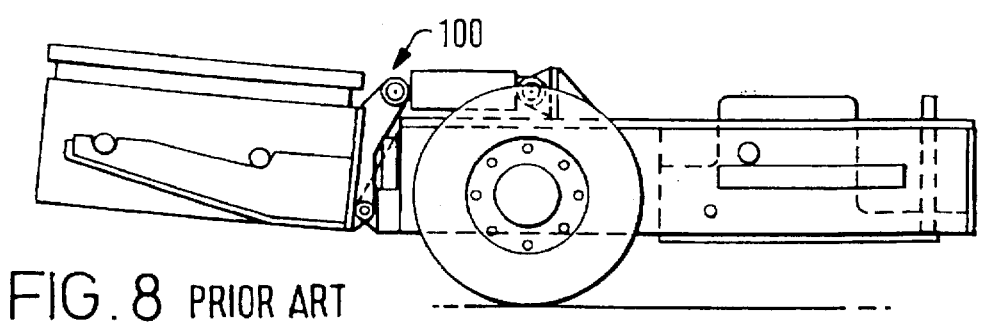
FIGS. 8-11 are a series of side elevational views of a prior art lifting device illustrating the operation of lifting or lowering a battery from a vehicle.
Figure 9:
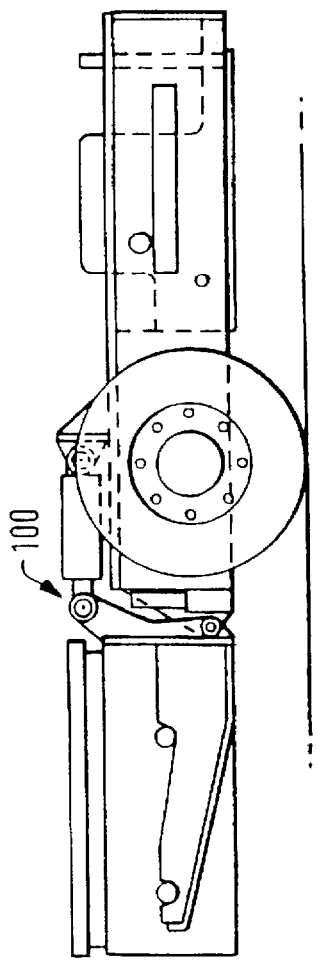
Figure 10:
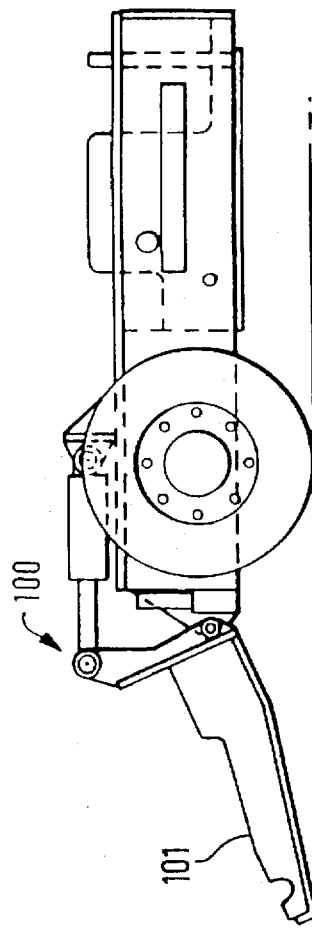
Figure 11:
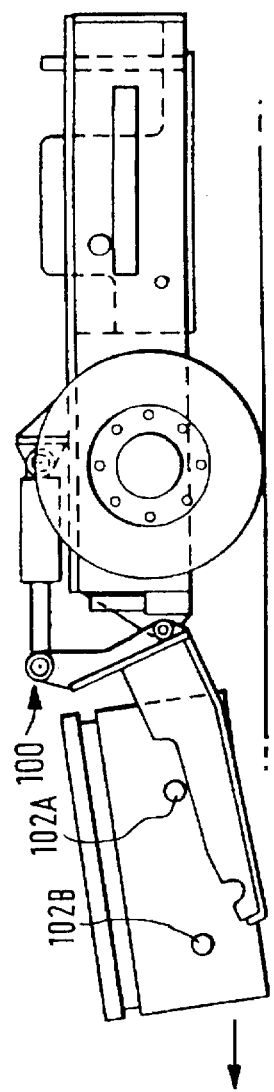

As shown more clearly in FIG. 7, the pivoted lifting device 10 includes generally "U" shaped battery support frame 22, including spaced apart main battery support arms 24 and 26. Battery support arms 24 and 26 may be a series of steel plates welded together and connected at their rearward lower ends to pivot rod 30 and at their upper rearward corner by structural support member 34. Alternatively, support arms 24 and 26 may be cast as uniform structural members. The support arms 24 and 26 include one end 106 and another end 108. The pivoted lifting device 10 further includes a pair of battery lift arms 28, each pivotally connected to main body arms 24 and 26 respectively.

Referring again to FIGS. 1-5, battery support frame 22 is hingedly connected to the rearward end 14 of vehicle 12 by a pivot rod 30 extending through structural tubing 32. Structural tubing 32 is connected to a lower portion of the vehicle frame 20, preferably by welding. Alternatively, as illustrated in FIG. 7, a pair of lugs 35 welded to a portion of the frame support 22 are adapted to receive pivot pins (not shown) to hingedly connect the frame support 22 to vehicle.

A pair of identical hydraulic cylinders 36 are rigidly mounted to the vehicle by cylinder pins 38 and pivotably mounted to structural support member 34 by rod end pins 40. The cylinders 36 selectively extend and retract to rotate battery support frame 22 about pivot rod 30 during battery changing operations. Alternatively, any motor capable of supply a drive force to the battery support frame may be used.

Figure 6:
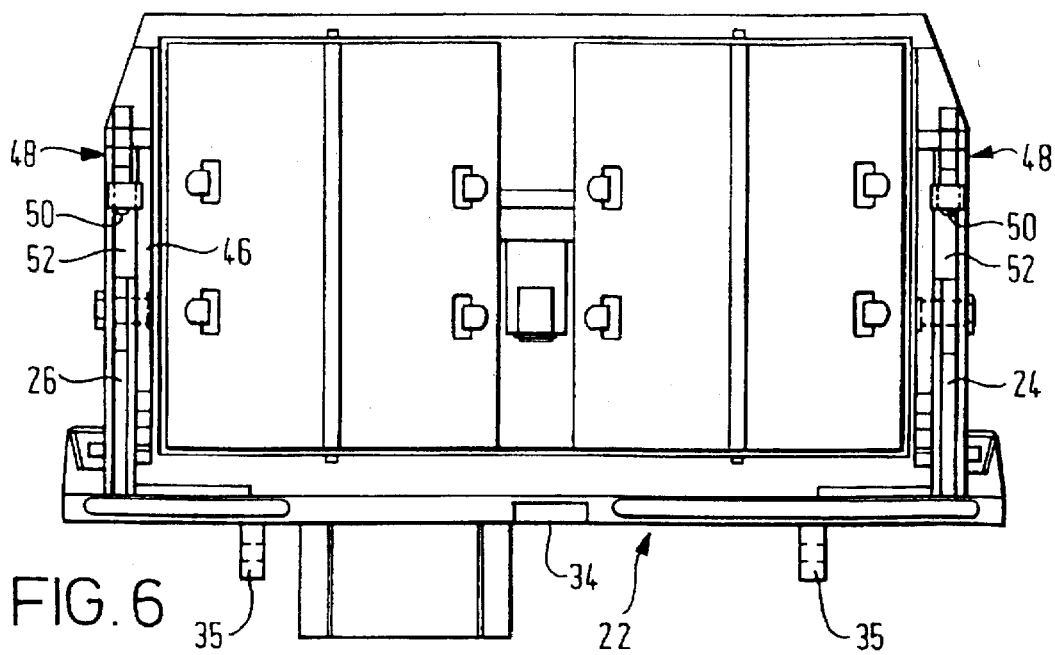
FIG. 6 is a top plan view of the pivoted lifting device of the present invention illustrating the lift arms engaged to a battery.

A pair of freely pivotable battery lift arms 28 are connected to the battery support arms 24 and 26 at pivot pin 56. As shown in FIGS. 6 and 7 battery lift arms 28 include three interconnected plates including an interior portion 42, an intermediate portion 52 and exterior portion 54. The three plates are preferably interconnected by welding. Alternatively, battery lift arms 28 may be cast as an integral structural member. The lift arms 28 include a mid-section 110.

The interior portion 42 of battery lift arms 28 includes a flat battery engagement surface 44 for engaging the underside of a battery lifting ledge 46 (see FIG. 1-5). The lifting ledge 46 provide an easily accessible point of contact between the battery and the lifting device.

A latching mechanism 48 of a type well known in the art, such as for example a steel plate 51 adapted to receive a pin is mounted on the distal end of battery lift arms 28. The latch mechanism 48 is adapted to receive a sliding pin 50 mounted on the battery case 17 for securely attaching the battery 15 to the battery lift arms 28. The latch pin receiving mechanism 51 is spaced outwardly from the interior portion 42 of the battery lift arm 28 and is placed over an intermediate portion 52 of the battery lift arms 28. The latching mechanism may alternatively take the form of a biased locking mechanism of a type well known in the art that automatically latches when the lift arm engagement surface 44 is flush against the lifting ledge 46.

An exterior portion 54 of the battery lift arm 28 is adjacent the intermediate portion to provide additional strength to the battery lift arm 28 and provide additional surface area outwardly from the lifting ledge 46 for mounting the latching mechanism 48 as illustrated in FIG. 7.

The battery lift arms 28 are connected to the main battery support arms 24 and 26 by pin 56 which extends horizontally through the exterior portion 54 of the battery lift arms 28, the main battery support arms 24 and 26 and the interior portion 42 of the battery lift arms 28. The pin 56 is secured in place by nut 57. The battery lift arms 28 have a predetermined weight distribution so that the arms 28 will attempt to rotate clockwise when able to freely pivot about pin 56.

Interior portion 42 of battery lift arms 28 includes a catch 66 or a hooked portion that engages the front edge 68 of the battery lift ledge 46. The catch 66 insures that the battery 15 is properly positioned on the pivoted lifting device 10 and also insures that the latching mechanism 48 will be aligned to receive the sliding pin 50 for securely connecting the battery 15 to the pivoted lifting device 10. The top surface 67 of catch 66 act as a striking surface and engages stop plate 58 to prevent rotation of the battery lift arms 28 in the clockwise direction as viewed in FIGS. 1-5 beyond a desired orientation. A separate stop plate 58 is preferably welded to each battery support arm 24 and 26. For example, the battery engagement surface 44 of battery lift arms 28 may only be rotated clockwise to a position substantially parallel with the surface of stop plate 58. The stop plate 58 does not prevent rotation of the battery lift arms 28 in the counter clockwise direction as viewed in FIG. 1 since the arms 28 are designed to have a rotating movement causing the arms to rotate clockwise.

Figure 5:
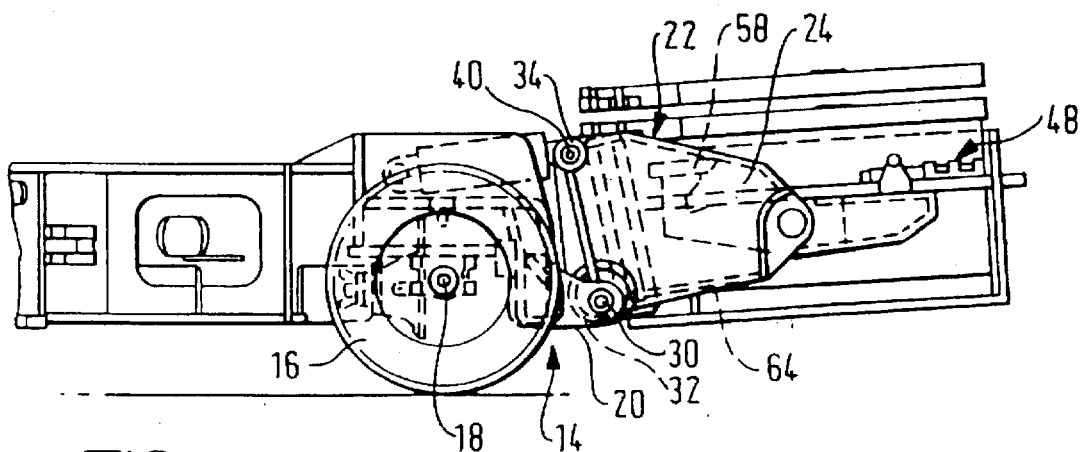
FIG. 5 is a side elevational view of the invention of FIG. 1 illustrating the battery locked in place on the vehicle and tilted above a horizontal orientation.

As shown in the series of illustrations in FIGS. 1-5, the present invention allows a battery 15 to be changed on a low profile mining vehicle with out causing damage to the battery or the walls or structure within the mine. In operation, the rearward end 14 of the mining vehicle 12 is guided toward a battery 15 positioned on the ground. The pair of hydraulic cylinders 36 are extended causing the main battery support frame 22 and the main battery support arms 24 and 26 to be rotated about the pivot rod 30 from its generally upright position and be disposed in a generally downwardly pointed direction. It should be understood that the upright position of the support frame 22 may be tilted from a vertical position toward the vehicle. That upright position as illustrated in FIG. 5, keeps the rearward edge of the battery from dragging on the ground when for example, there is a lump in the surface that the vehicle is riding on and similarly prevent the upper front edge of the battery from striking similar protrusions from the mine roof. The battery lift arms 28 are freely pivotable on the main support arms 24 and 26 at this point. Due to its uneven weight distribution, the engagement surface 44 is disposed in an orientation clockwise from horizontal. Alternatively, arm 28 may be biased by a spring mechanism to an orientation clockwise from horizontal. As the vehicle approaches the battery 15, the battery engagement surface 44 of the interior portion 42 of battery lift arm 28 engages the front edge 68 of the battery lifting ledge 46. It is preferred that the portion of the battery engagement surface 44 that is initially contacted by the front edge 68 be the portion of the engagement surface between the pivot pin 56 and the catch 66 of the battery lift arm 28. Because the lift arm 28 is freely rotatable, the initial contact with the battery provides virtually no resistive force or upward force on the battery. Rather, the front edge 68 of the battery lifting ledge 46 slides along the battery engagement surface 44, deflecting the portion of the lift arm 28 between the pivot pin 56 and the catch 66 downwardly or counter clockwise as viewed in FIG. 2. Thus, the battery 15 is not lifted off of the ground nor is it caused to slide along the ground since little or no force is acting upwardly on the battery. This lifting off of the ground of the battery and wedging the lower rearward edge of the battery into the ground is a common deficiency found in the prior art and is illustrated in FIGS. 8–11. As illustrated in FIGS. 8–11, prior art lifting devices 100 utilized a ramped surface 101 on the lift arms to engage rollers 102 disposed on the battery. In order for the front roller 102A to ride up the ramp, the lateral force is provided by moving the vehicle forward. However, this had a tendency to slide the battery along the floor until the battery was braced against a wall or the lower rearward edge of the battery dug into the ground to counteract the sliding lateral force supplied by the vehicle.

In the present invention, when the front end 68 of the battery lifting ledge 46 reaches and engages the catch 66, the battery engagement surface 44 should be deflected into flush engagement with the underside of battery lifting ledge 46. At this point, the battery latch 48 may be attached manually or automatically to securely connect the battery to the pivoted lifting and support device.

The operator can then retract the cylinders 36 to begin rotation of the main support frame 22 to its upright position. While this is occurring, the engagement surface 44 of the battery lift arms 28 are maintained flush with the lifting ledge 46 due to the relative rotation between the battery lift arms 28 and the main support arms 24 and 26 caused by the connection through pin 56. The relative rotation continues until striking surface 67 engages the stop plate 58 of the main battery support arms 24 and 26 preventing further relative rotation between the main support arm and the battery lift arms. During this period of rotation, the battery engagement surface 44 is maintained in flush contact with the battery lifting ledge 46 and the movement of the battery is substantially in the vertical direction. The end of the relative rotation between the support arms 24 and 26 and the battery engagement arms 28 will preferably occur when the lower edge 64 of the main support arms is substantially parallel to the battery lifting ledge 46.

The reverse of the operation described above would be utilized in order to remove a drained battery from the low profile vehicle.

It is thought that the present invention and its advantages will be understood from the foregoing description and it will be apparent that various changes may be made thereto without departing from its spirit and scope of the invention or sacrificing all of its material advantages, the form hereinbefore described being merely preferred or exemplary embodiment thereof.

Having thus described the invention, what is claimed is:

1. A pivoted lifting device comprising:
   a frame, said frame including a pair of spaced apart support members having one end rotatable about a horizontal axis and another end;
   a drive mechanism connected to said frame for selectively rotating said other ends about said horizontal axis between an upright position and a downwardly angled position below the upright position;
   engagement members having an engagement surface, said engagement members having a mid-section pivotably connected to the other end of said support members and freely rotatable relative to said support members the engagement members having a first end and a second end, the second ends extend away from the frame, the engagement members having a rotating moment to encourage the engagement members to pivot in a predetermined direction to cause the second ends to move in a downward direction;
   limiting means mounted to the device for limiting the extent the second ends of the engagement members move in the downward direction relative to said support members whereby substantially the entire engagement surface is in contact with an article to be lifted prior to the article being displaced from an at rest position.

2. The pivoted lifting device of claim 1 wherein said lifting device is connected to a vehicle.

3. The pivoted lifting device of claim 2 wherein said vehicle is a low profile mining vehicle.

4. The pivoted lifting device of claim 1 wherein said frame includes an upper section and a lower section and said lower section is hingedly connectable to a vehicle.

5. The pivoted lifting device of claim 1 wherein said drive mechanism includes at least one hydraulic cylinder.

6. The pivoted lifting device of claim 1 wherein said engagement surface of each said engagement member is disposed interiorly of a respective one of said support members.

7. The pivoted lifting device of claim 1 wherein said engagement members are pivotally connected to a respective one of the support members with a pivot pin.

8. The pivoted lifting device of claim 1 wherein said limiting means includes a stop plate mounted on at least one of said support members to engage at least one of said engagement members at a predetermined position to restrict the free rotation therebetween.

9. The pivoted lifting device of claim 1 further including a latch mechanism mounted on said engagement members, whereby said article is securable to said engagement members.

10. The pivoted lifting device of claim 9 wherein said latch mechanism includes a steel plate.

11. The pivoted lifting device of claim 1 further including a hitch mounted on the engagement members, whereby said article is selectively connectable and disconnectable from said engagement members.

12. A battery changing system and electric battery powered vehicle comprising:

a support frame, said frame including spaced apart battery support members having one end hingedly connected about a horizontal axis to said vehicle and another end;

at least one hydraulic cylinder pivotally mounted to said vehicle at one end and to said support frame at the other end for selectively rotating said other ends about said horizontal axis between an upright vehicle operating position and downwardly angled loading and unloading position below the upright vehicle operating position;

a pair of battery engagement arms each including a battery engaging surface for engaging a lift portion of the battery, said battery engagement arms having a mid-section freely rotatable about a horizontal axis over a pre-determined arc length and pivotally mounted to said battery support members, the engagement arms having a first end and a second end, the second ends extend away from the frame, the engagement arms having a rotating moment to encourage the engagement arms to pivot in a predetermined direction to cause the second ends to move in a downward direction;

means mounted to the support frame for limiting the extent the second ends of the engagement arms move in the downward direction relative to said battery support members whereby substantially the entire battery engagement surface contacts the lift portion of the battery prior to the battery being displaced from an at rest position.

13. The battery changing system of claim 12 wherein said vehicle is a low profile mining vehicle.

14. The battery changing system of claim 12 wherein said battery engagement surface of said battery engagement arms is disposed interiorly of said battery support members.

15. The battery changing system of claim 12 wherein said limiting means includes a plate mounted on at least one of said support members to engage at least one of said battery engagement arms at a predetermined position to restrict relative rotation therebetween.

16. The battery changing system of claim 12 further including a latch mechanism mounted on said battery engagement arms.

17. The battery changing system of claim 16 wherein said latch mechanism includes a steel plate to receive a pin mounted on said battery.

18. The battery changing system of claim 12 further including a hitch mounted on said battery engagement arms, whereby said battery is selectively connected and disconnected from said battery engagement arms.

19. A pivoted lifting device for use with a vehicle comprising in combination:

a frame connectable to said vehicle, said frame including a pair of spaced apart support members having one end rotatable about a horizontal axis and another end;

at least one hydraulic cylinder pivotally mountable to said vehicle at one end and to said frame at the other end for selectively rotating said frame about said horizontal axis between an upright position and a downwardly angled position below the upright position;

a pair of engagement arms each including an engagement surface for engaging a lift portion of an article, said engagement arms having a mid-section connected by a pivot pin to said support members and sized and shaped so as to have a tendency to rotate in a predetermined direction about said pivot pin, the engagement arms having a first end and a second end, the second ends extend away from the frame, the engagement arms having a rotating moment to encourage the engagement arms to pivot in a predetermined direction to cause the second ends to move in a downward direction;

means mounted to the device for limiting the extent the second ends of the engagement arms move in the downward direction relative to said support members whereby substantially the entire engagement surface contacts the lift portion of said article prior to the article being displaced from an at rest position.

20. A pivoted lifting device comprising:

a frame, said frame including a pair of spaced apart support members having one end rotatable about a horizontal axis and another end;

at least one hydraulic cylinder connected to said frame for selectively rotating said other ends about said horizontal axis between an upright position and a downwardly angled position below the upright position;

a pair of engagement arms each including engagement surfaces for engaging a lift portion of an article; said engagement arms having a mid-section connected by a pivot pin to said support members and sized and shaped so as to have a tendency to rotate in a pre-determined direction about said pivot pin, the engagement arms having a first end and a second end, the second ends extend away from the frame, the engagement arms having a rotating moment to encourage the engagement arms to pivot in a predetermined direction to cause the second ends to move in a downward direction;

limiting means mounted to the device for limiting the extent the second ends of the engagement arms move in the downward direction relative to said support members whereby substantially the entire engagement surface contacts the lift portion of said article prior to the article being displaced from an at rest position.

\* \* \* \* \*